(12) United States Patent
Back et al.

(10) Patent No.: US 12,340,144 B2
(45) Date of Patent: Jun. 24, 2025

(54) APPARATUS FOR AND METHOD OF CONTROLLING IN IN-VEHICLE INFOTAINMENT SYSTEM

(71) Applicant: HYUNDAI MOBIS CO., LTD., Seoul (KR)

(72) Inventors: Ji Hye Back, Yongin-si (KR); Bo Young Park, Yongin-si (KR); Jae Yeon Park, Yongin-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 0 days.

(21) Appl. No.: 18/765,471

(22) Filed: Jul. 8, 2024

(65) Prior Publication Data

US 2025/0021291 A1 Jan. 16, 2025

(30) Foreign Application Priority Data

Jul. 13, 2023 (KR) .......................... 10-2023-0091254

(51) Int. Cl.
*G06F 3/14* (2006.01)

(52) U.S. Cl.
CPC .................................. *G06F 3/1454* (2013.01)

(58) Field of Classification Search
CPC .... B60K 2360/1526; B60K 2360/1523; B60K 35/21; B60K 2360/573; B60K 2360/56; B60K 2360/563; B60K 2360/566; B60K 2360/577; B60K 2360/569; B60K 2360/164; B60K 35/22; B60K 2360/143; B60K 2360/1438; B60K 2360/1434; B60K 35/00; B60K 35/28; B60K 35/29; B60K 35/85; B60K 2360/184; H04M 1/724098; H04M 1/72448; G06F 3/14; G06F 3/1454; G06F 3/0481; G06F 1/1605; G09G 2380/10; G09G 5/12; H04N 21/41265; H04N 21/4126; H04N 21/41407; H04N 21/41422; B60Y 2400/92; B60R 16/0243

See application file for complete search history.

(56) References Cited

U.S. PATENT DOCUMENTS

| | | | |
|---|---|---|---|
| 2013/0013148 A1* | 1/2013 | Park | H04W 4/00 701/1 |
| 2015/0268842 A1* | 9/2015 | Kim | B60K 35/10 715/762 |

FOREIGN PATENT DOCUMENTS

KR        10-2279301 B1    7/2021

* cited by examiner

*Primary Examiner* — Koosha Sharifi-Tafreshi
(74) *Attorney, Agent, or Firm* — NSIP Law

(57) ABSTRACT

An apparatus and method for controlling an in-vehicle infotainment system are provided. The apparatus includes: a vehicular-information input device to input a vehicular state; a communicator for mirroring with a mobile terminal; an input and output device to display output information based on information input thereinto; a memory having an executable program stored therein; and a processor operatively coupled to the vehicular-information input device, the communicator, the input and output device, and the memory. The processor is configured to control the communicator to establish a connection to the mobile terminal, compare the vehicular state, input from the vehicular-information input device, with a user-set state of a mirror function, activate the mirroring function of mirroring with the mobile terminal, and output a screen of the mobile terminal through the input and output device.

16 Claims, 4 Drawing Sheets

[TASK PRECEDENCE MODE]

[MOBILE-ACTIVITY PRECEDENCE MODE]

APPARATUS FOR AND METHOD OF CONTROLLING IN IN-VEHICLE INFOTAINMENT SYSTEM

CROSS-REFERENCE TO RELATED APPLICATION

This application claims priority from and the benefit of Korean Patent Application No. 10-2023-0091254, filed on Jul. 13, 2023, which is hereby incorporated by reference for all purposes as if set forth herein.

BACKGROUND

1. Field

Exemplary embodiments relate to an apparatus for and a method of controlling a vehicular infotainment system, and more particularly, to an apparatus for and a method of controlling an in-vehicle infotainment system, the apparatus and the method being capable of selectively activating a mirroring function of mirroring with a mobile terminal according to a user-set state and a vehicular traveling state.

2. Discussion of Related Art

With growing concerns related to vehicles, driven by factors such as electric vehicles and autonomous traveling, vehicle manufacturers prioritize the acquisition of in-vehicle entertainment content.

In-vehicle infotainment systems (IVI) refer to systems capable of providing entertainment and information within a vehicle.

That is, the in-vehicle infotainment system provides information, referring to necessary information associated with vehicular traveling, path guidance, and the like, and entertainment, referring to various amusements and human-friendly functions, within a vehicle.

The in-vehicle infotainment system can provide not only path guidance information for reaching a destination, vehicular state information for safe traveling, and information for a comfortable in-vehicle environment and the like, but also amusements that may interest a driver, and various functions, including an SNS function, Internet search, and the like.

Continuous developments in operating systems (OSs) have led to the development of in-vehicle infotainments and the integration thereof within vehicles, and developments in information technology (IT) have enabled these functions while vehicles travel. Therefore, in-vehicle infotainment technologies and markets have experienced significant growth over the years, owing to not only a combination of a navigation system, audio and video systems, and the Internet, but also the popularity of smartphones and tablet PCs and advancements in IT.

In recent years, with rapid growth in the popularity of smartphones, various services that utilize the smartphones have been provided for everyday use. In a case where a smartphone is used, it is difficult to use the smartphone during vehicular traveling. Particularly, the size of the screen of the smartphone is small, a driver has difficulty in viewing content on the screen.

Currently, vehicular monitors, on which an image being output from a vehicular audio/video/navigation (AVN) device is displayed, are installed in most of the vehicles. The vehicular monitor provides a relatively larger screen than the mobile terminal.

Accordingly, in recent years, there has been a growing interest in mirroring technologies that allow a user's mobile terminal to be used in conjunction with a vehicular head unit to enhance driver convenience and safety.

In the related art, technologies that enable mirroring between the head unit and the mobile terminal relate to those for transferring a screen and audio information, which are output from the mobile terminal, to the head unit within a vehicle through a wired or wireless interface. That is, most of the technologies in the related art are those for transferring data in one direction from the mobile terminal and the head unit. Therefore, most of the technologies in the related art have a limitation in that the driver cannot control the mobile terminal by operating the head unit within the vehicle. Therefore, most of the technologies in the related art have a limitation in that the driver cannot control the mobile terminal by operating the head unit within the vehicle. However, in recent years, compatibility with mobile content on the mobile terminal has been provided based on a connected car OS platform. Thus, the infotainment system can also utilize the mobile content and additionally can provide utility similar to that of the mobile terminal in the same proportion as is provided by the mobile terminal.

The related art of the present disclosure is disclosed in Korean Patent No. 10-2279301 (published on Jul. 20, 2021 and entitled MIRRORING DEVICE IN VEHICLE AND PAIRING METHOD THEREOF).

SUMMARY

Various embodiments are directed to an apparatus for and a method of controlling an in-vehicle infotainment system, the apparatus and the method being capable of selectively activating a mirroring function of mirroring with a mobile terminal according to a user-set state and a vehicular traveling state and additionally switching to content received during vehicular traveling for displaying the content, after activating the mirroring function.

This Summary is provided to introduce a selection of concepts in simplified form that are further described below in the Detailed Description. This Summary is not intended to identify key features or essential features of the claimed subject matter, nor is it intended to be used as an aid in determining the scope of the claimed subject matter.

In a general aspect of the disclosure, an apparatus for controlling an in-vehicle infotainment system includes: a vehicular-information input device configured to input a vehicular state; a communicator for mirroring with a mobile terminal; an input and output device configured to display output information based on information input thereinto; a memory having an executable program stored therein; and a processor operatively coupled to the vehicular-information input device, the communicator, the input and output device, and the memory, wherein the processor is configured to: control the communicator to establish a connection to the mobile terminal; compare the vehicular state, input from the vehicular-information input device, with a user-set state of a mirror function; activate the mirroring function of mirroring with the mobile terminal; and output a screen of the mobile terminal through the input and output device.

The processor may be further configured to store the user-set state by executing a mirroring activation mode in accordance with a timeline.

In case the comparison with the user-set state results in a mirroring activation mode, the processor may be further configured to activate the mirroring function through the comparison of the vehicular state.

The processor may be further configured to: disable the mirroring function in case the vehicular state indicates vehicular traveling; and activate the mirroring function in case the vehicular state indicates vehicular stoppage.

In case content received during vehicular traveling is present, the processor may be further configured to control the input and output device to display the content received after activating the mirroring function.

In another general aspect of the disclosure, a method of controlling an in-vehicle infotainment system includes: establishing, by a processor, a connection to a mobile terminal through a communication module; determining, by the processor, a user-set state of a mirroring function; determining, by the processor, a vehicular state, input from a vehicular-information input module, based on the user-set state; and outputting, by the processor, a screen of the mobile terminal through an input and output module by activating the mirroring function of mirroring with the mobile terminal as a result of determining the vehicular state.

The method may further include setting, by the processor, the user-set state by being set to execute a mirroring activation mode in accordance with a timeline.

In the determining by the processor of the vehicular state, in case the determination of the user-set state results in the mirroring activation mode, the processor may be further configured to determine the vehicular state.

In the outputting by the processor of the screen of the mobile terminal through the input and output device, the processor may disable the mirroring function in case the determination of the vehicular state results in vehicular traveling, and activate the mirroring function in case the determination of the vehicular state results in vehicular stoppage.

In the outputting by the processor of the screen of the mobile terminal through the input and output device, in case content received in the mobile terminal during vehicular traveling is present, the processor may display the content received after activating the mirroring function.

In yet another general embodiment of the disclosure, a system for controlling in-vehicle infotainment includes: a vehicular-information input device configured to provide a vehicular state; a communicator for communicating with a mobile terminal; an input and output device comprising a touch display; a memory having an executable program stored therein; and a processor operatively coupled to the vehicular-information input device, the communicator, the input and output device, and the memory, wherein the processor may be configured to: control the communicator to establish a connection to the mobile terminal; compare the vehicular state, provided by the vehicular-information input device, with a user-set state of a mirroring function; activate the mirroring function of mirroring with the mobile terminal; and output a screen of the mobile terminal through the input and output device.

The processor may be further configured to store the user-set state by executing a mirroring activation mode in accordance with a timeline.

The processor may be further configured to: determine a priority among the user-set state and the vehicular state; activate the mirroring function in case the user-set state has priority over the vehicular state; and deactivate the mirroring function in case the vehicular state has higher priority over the user-set state.

The processor may be further configured to: disable the mirroring function in case the vehicular state indicates that the vehicle is moving; and activate the mirroring function in case the vehicular state indicates the vehicle is immobile.

In case content is received while the vehicle is moving, the processor may be further configured to control the input and output device to display the content received after activating the mirroring function.

The processor may be further configured to display a screen of the in-vehicle infotainment in conjunction with a screen of the mobile terminal on the display of the input and output device.

In addition, applications used in the mobile terminal can also be used by enabling a screen of the in-vehicle infotainment to be displayed in conjunction with the screen of the mobile terminal. Thus, the mobile terminal and the in-vehicle infotainment system can operate in conjunction with each other in a seamless manner. Additionally, the in-vehicle infotainment system can operate in a manner that enhances compatibility with the mobile terminal. As a result, necessary content can be automatically proposed to the user, thereby providing the maximized utility.

DETAILED DESCRIPTION

Figure 1:
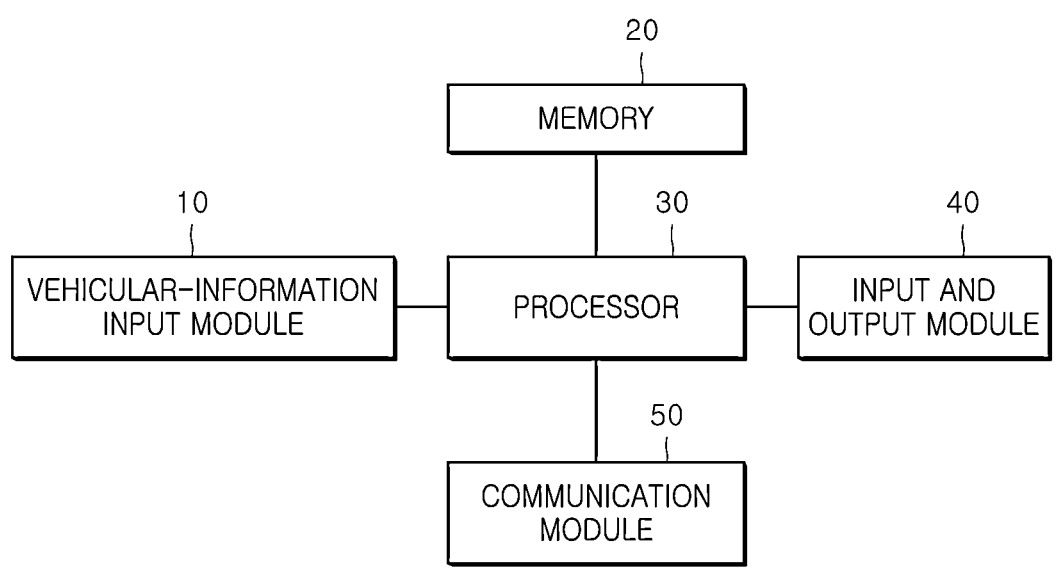
FIG. 1 is a block diagram illustrating an apparatus for controlling an in-vehicle infotainment system according to the first embodiment of the present disclosure.
Figure 1:
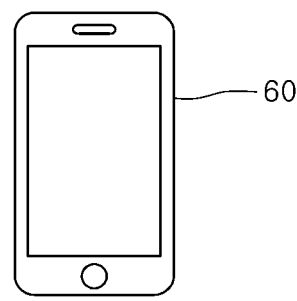

An apparatus for and a method of controlling an in-vehicle infotainment system according to first and second embodiments, respectively, of the present disclosure will be described with reference to the accompanying drawings. For clarity and convenience in description, thicknesses of lines, sizes of constituent elements, and the like may be illustrated in a non-exact proportion in the drawings. In addition, terms used hereinafter to refer to constituent elements, respectively, according to the present disclosure are defined by considering their respective functions and may be adjusted according to a user's or manager's intentions or to established practices in the art. Therefore, these terms should be contextually defined in light of the present specification.

Figure 2:
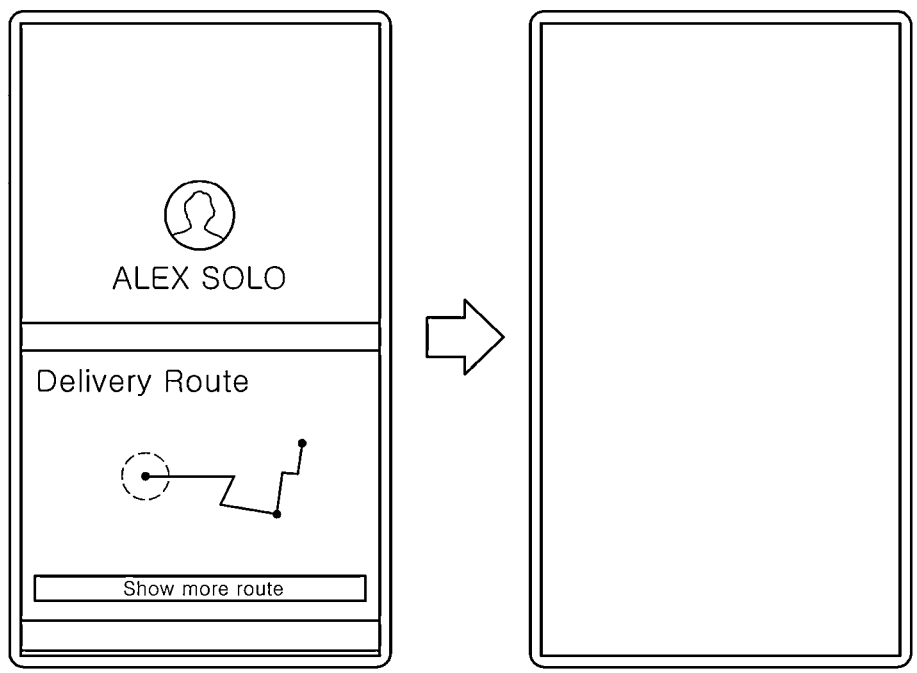
FIG. 2 is a group of views illustrating activated and inactivated states of a mirroring function in the apparatus for controlling an in-vehicle infotainment system according to the first embodiment of the present disclosure.
Figure 2:
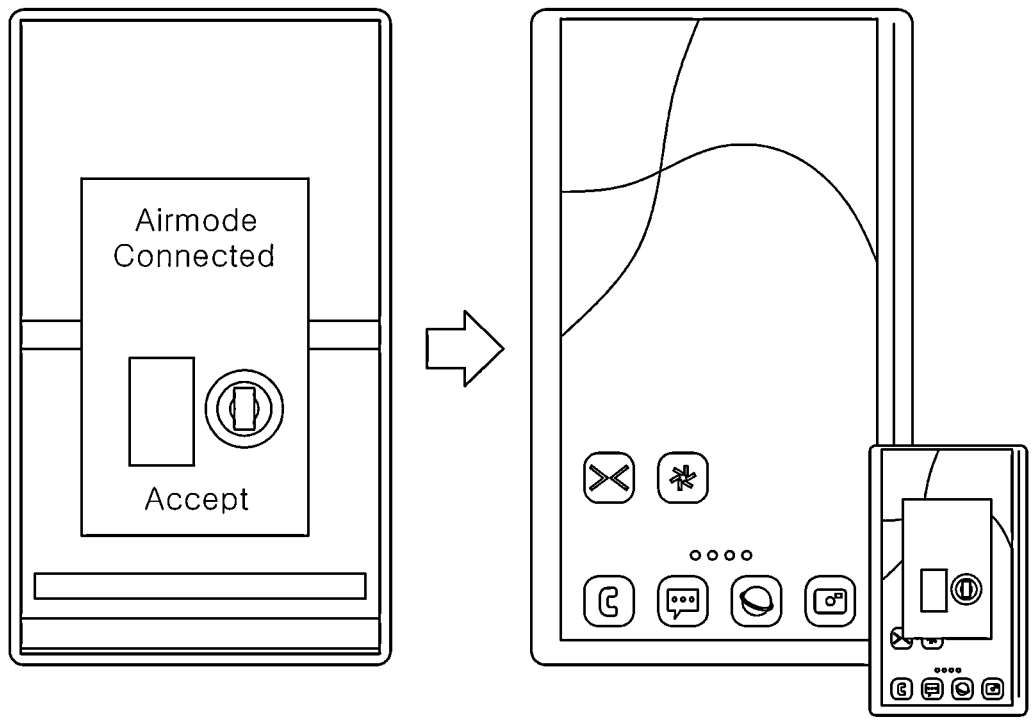
Figure 3:
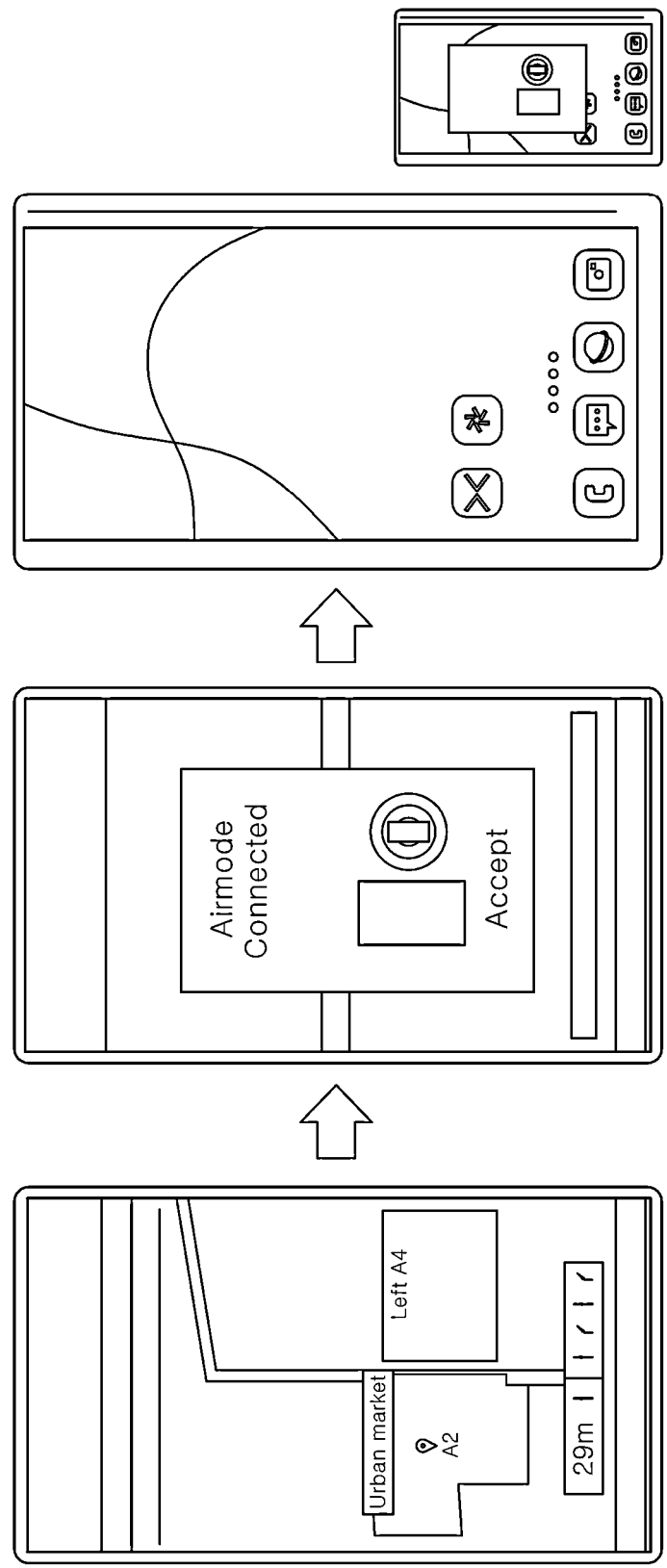
FIG. 3 is a group of views illustrating states in which switching to content received during vehicular traveling takes place after mirroring in the apparatus for controlling an in-vehicle infotainment system according to the first embodiment of the present disclosure.

FIG. 1 is a block diagram illustrating an apparatus for controlling an in-vehicle infotainment system according to the first embodiment of the present disclosure. FIG. 2 is a group of views illustrating activated and inactivated states of a mirroring function in the apparatus for controlling an in-vehicle infotainment system according to the first embodiment of the present disclosure. FIG. 3 is a group of views illustrating states in which switching to content received during vehicular traveling takes place after mirroring in the apparatus for controlling an in-vehicle infotainment system according to the first embodiment of the present disclosure.

As illustrated in FIG. 1, the apparatus for controlling an in-vehicle infotainment system according to the first embodiment of the present disclosure may include a vehicular-information input module 10 (e.g., a vehicular-information input device), a communication module 50 (e.g., a communicator such as a transceiver), an input and output module 40 (e.g., a touch screen display), a memory 20, and a processor 30.

A vehicular state is input into the vehicular-information input module 10, thereby enabling the activation of the mirroring function to be determined based on a vehicular traveling state and a vehicular stoppage state.

The communication module 50 may establish a connection to a mobile terminal 60 and may provide a wired and wireless communication interface for mirroring. For example, the communication module 50 may provide an interface for USB communication or Bluetooth communication.

The input and output module 40 may include a touch sensor and a display panel and may display an image on the display panel. The input and output module 40 may display output information on a touch screen that detects touch, and information selected from the touch screen may be input into the input and output module 40 through the touch screen.

Store in the memory 20 may be not only an executable program for controlling an in-vehicle infotainment system and data related thereto, but also a user-set state and the like. Stored pieces of information may be selected by the processor 30 whenever necessary.

That is, stored in the memory 20 are various types of data and commands generated while an application (a program or an applet) or an operating system (O/S) for driving a control device of the in-vehicle infotainment system is executed. Examples of the memory 20 here may include a nonvolatile memory, a volatile memory, a hard disk driver (HDD), a solid-state drive (SDD), and the like. The memory 20 may be accessed, and the processor 30 may perform reading, recording, amending, deleting, and updating on the data stored in the memory 20.

The processor 30 is operatively coupled to the vehicular-information input module 10, the communication module 50, the input and output module 40, and the memory 20. Thus, to control the overall operation of the apparatus for controlling an in-vehicle infotainment system, the processor 30 may perform various operations by loading various programs, stored the memory 20, onto a RAM and executing these programs.

The processor 30 here is described as being one CPU. However, the processor 30 may be implemented as a plurality of CPUs (or a plurality of DSPs, SoCs, or the like).

As various implementation examples, the processor 30 may be implemented as a digital signal processor DSP, a microprocessor, or a time controller (TCON). However, the processor 30 is not limited thereto and may be implemented as one or more of the following: a central processing unit (CPU); a micro-controller unit (MCU); a micro-processing unit (MPU); a controller; an application processor (AP); a communication processor (CP); and an ARM processor may be used as the processor 30. Alternatively, the processor 30 may be defined as one of these terms. In addition, the processor 30 may be implemented as a system-on-chip (SoC) or a large-scale integration (LSI) circuit, each with an embedded processing algorithm or may be implemented in the form of a field-programmable gate array (FPGA).

That is, the processor 30 establishes a connection to the mobile terminal 60 through the communication module 50. The processor 30 may activate the mirroring function of mirroring with the mobile terminal 60 by comparing the vehicular state, input from the vehicular-information input module 10, with the user-set state, and then may output a screen of the mobile terminal 60, equipped with the mirroring function, through the input and output module 40.

At this point, the processor 30 may store a user-set state in the memory 20 by being set to activate a mirroring activation mode in accordance with a timeline.

For example, when a task precedence mode that requires a focus on a task is scheduled to be executed during the time span 08:00 to 12:00, the processor 30 may inactivate the mirroring activation mode. When a mobile-activity precedence mode is scheduled to be executed during the time span 12:01 to 13:00, the processor 30 may activate the mirroring activation mode. When the task precedence mode is scheduled to be executed during the time span 13:01 to 17:00, the processor 30 may inactivate the mirroring activation mode. In addition, days of the week may be specified. The mirroring activation mode may also be scheduled to be on a day-of-the-week basis.

Therefore, in a case where the comparison with the user-set state results in the mirroring activation mode, the processor 30 may activate the mirroring function through the comparison of the vehicular state.

During the vehicular traveling, for safe-traveling reason, the in-vehicle infotainment system is required to disable the mirroring function of the mobile terminal 60 and provides information associated with the vehicular traveling. For this reason, based on vehicular information being input, the processor 30 may disable the mirroring function in a case where the vehicular state indicates vehicular traveling and may activate the mirroring function in a case where the vehicular state indicates vehicular stoppage.

Therefore, as illustrated in FIG. 2, in a case where the user-set state matches with the task precedence mode, even though a vehicle comes to a stop, the processor 30 does not activate the mirroring function (air mode).

In a case where the user-set state matches with the execution of the mobile-activity precedence mode, when the vehicle comes to a stop, the processor 30 may output the screen of the mobile terminal 60 through the input and output module 40 by activating the mirroring function (air mode).

In a case where content received in the mobile terminal 60 during the vehicular traveling is present, after activating the mirroring function, the processor 30 may display the received content.

For example, as illustrated in FIG. 3, during the vehicular traveling, a notification mail may be received. In such a case, when the vehicle comes to a stop, the mirroring function is indicated as activated, and then a mail application is executed for switching to a screen for mail content. Thereafter, the notification mail can be displayed on the screen for the mail content.

As described above, in the apparatus for controlling an in-vehicle infotainment system according to the first embodiment of the present disclosure, the mirroring function of mirroring with the mobile terminal is selectively activated according to the user-set state and the vehicular traveling state. Additionally, the content received during the vehicular traveling is displayed after the mirroring function is activated. In this manner, the in-vehicle infotainment system has a mobile activity-friendly utility, and thus enables a user to experience the same convenience in the vehicle as in a mobile environment.

Figure 4:
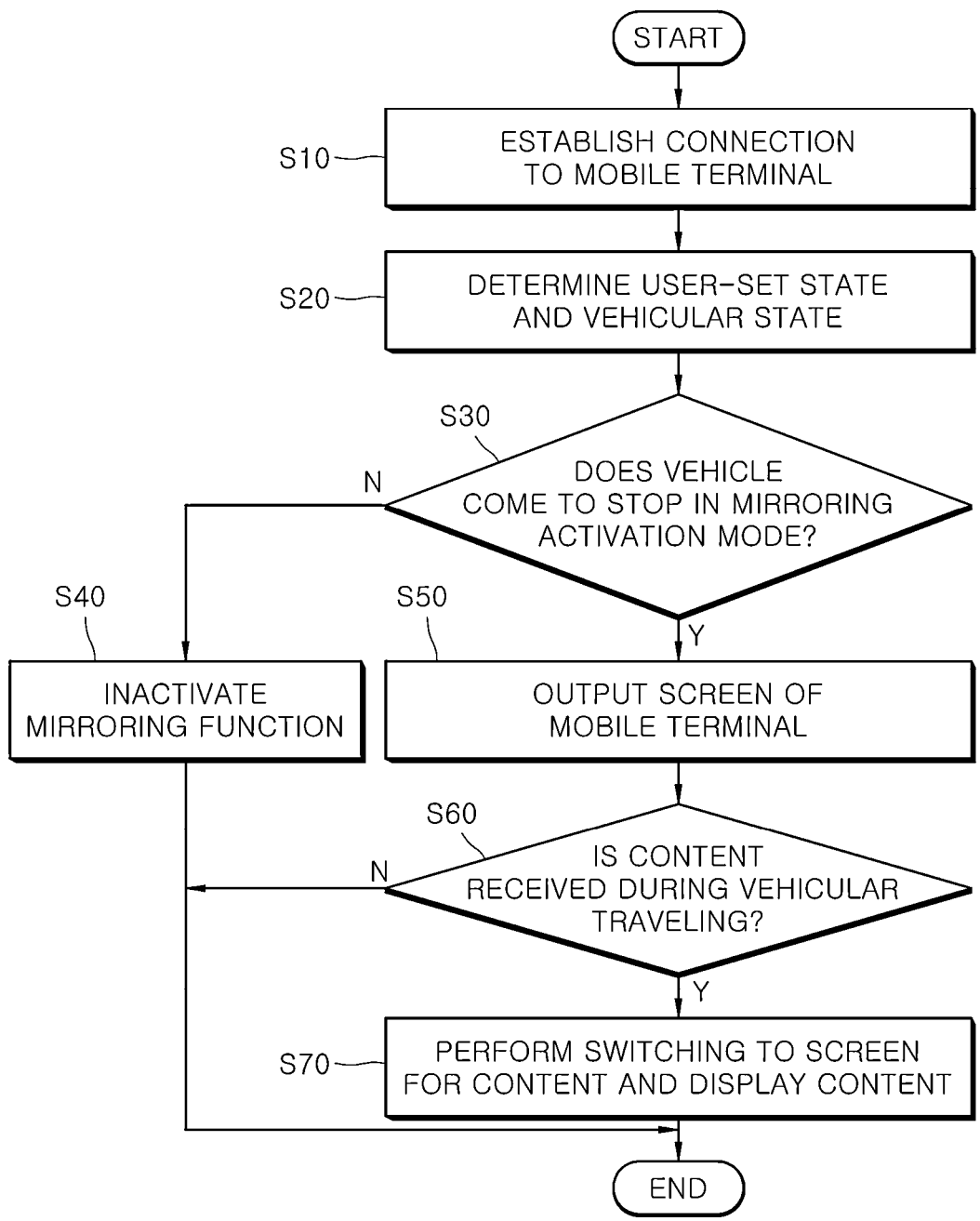
FIG. 4 is a flowchart that is referenced to describe a method of controlling an in-vehicle infotainment according to a second embodiment of the present disclosure.

FIG. 4 is a flowchart that is referenced to describe the method of controlling an in-vehicle infotainment system according to the second embodiment.

As illustrated in FIG. 4, in the method of controlling an in-vehicle infotainment system according to the second embodiment, first, the processor 30 executes an executable program stored in the memory 20, and then establishes a connection to the mobile terminal 60 through the communication module 50, thereby being registered therewith (S10).

In Step S10, in a state of establishing a connection to the mobile terminal 60, the processor 30 determines a user-set state of the mirroring function that is stored in the memory 20. In addition, the processor 30 determines a vehicular state that is input through the vehicular-information input module 10 (S20).

The processor 30 determines the user-set state of the vehicular state in Step S20, and thus determines whether or not the vehicle comes to a stop in the mirroring activation mode (S30).

That is, the processor 30 may determine, according to the user-set state stored in the memory 20, whether or not a current time span is a time span during which the mirroring activation mode is scheduled to be executed, and may determine, through the vehicular traveling state, whether or not the vehicle is in the vehicular stoppage state.

At this point, the processor 30 may store the user-set state in the memory 20 by being set to execute the mirroring activation mode in accordance with a timeline.

For example, when the task precedence mode that requires a focus on a task is scheduled to be executed during the time span 08:00 to 12:00, the processor 30 may inactivate the mirroring activation mode. When the mobile-activity precedence mode is scheduled to be executed during the time span 12:01 to 13:00, the processor 30 may activate the mirroring activation mode. When the task precedence mode is scheduled to be executed during the time span 13:01 to 17:00, the processor 30 may inactivate the mirroring activation mode. In addition, days of the week may be specified. The mirroring activation mode may also be scheduled to be on a day-of-the-week basis.

In Step S30, the mirroring activation mode and the vehicular stoppage state are determined. In a case where the mirroring activation mode is set or where the vehicle is in the vehicular stoppage state, the mirroring function is activated (S40).

At this point, in a case where the determination of the user-set state results in the mirroring activation mode, the processor 30 may determine the vehicular state.

In contrast, when in Step S30, as a result of determining the mirroring activation mode and the vehicular stoppage state, the mirroring activation mode is set and the vehicle is in the vehicular stoppage state, the processor 30 outputs a screen of the mobile terminal 60 through the input and output module 40 by activating the mirroring activation mode (S50).

For example, as illustrated in FIG. 2, in a case where the user-set state matches with the task precedence mode, even though the vehicle comes to a stop, the mirroring function is not activated. Furthermore, in a case where the user-set state matches with the mobile-activity precedence mode, when the vehicle comes to a stop, the mirroring function is activated, and the screen of the mobile terminal 60 can be output through the input and output module 40.

In this manner, the processor 30 determines whether content received during the vehicular traveling is present, after outputting the screen of the mobile terminal 60 by activating the mirroring function (S60).

In a case where it is determined in Step S60 that the content received during the vehicular travel is present, the processor 30 switches to a screen for the content and displays the received content thereon (S70).

For example, as illustrated in FIG. 3, during the vehicular traveling, a notification mail may be received. In such a case, when the vehicle comes to a stop, the mirroring function is indicated as activated, and then the mail application is executed for switching to the screen for mail content. Thereafter, the notification mail can be displayed on the screen for the mail content.

As described above, in the method of controlling an in-vehicle infotainment system according to the second embodiment of the present disclosure, the mirroring function of mirroring with the mobile terminal is selectively activated according to the user-set state and the vehicular traveling state. Additionally, the content received during the vehicular traveling is displayed after the mirroring function is activated. In this manner, the in-vehicle infotainment system has the mobile activity-friendly utility, and thus enables the user to experience the same convenience in the vehicle as in a mobile environment.

Features of the present disclosure, which are described in the present specification, may be realized in the form of, for example, a method, a process, an apparatus, a software program, a data stream, or a signal. The features, although described in terms of realization in a single form (for example, although described as only a method), may also be implemented in other forms (for example, an apparatus and a program). The apparatus may be implemented in the form of adequate hardware, software, firmware, or the like. The method may be realized, for example, in computers or microprocessors. Furthermore, the method may be realized in processors that usually refer to processing devices including an integrated circuit, a programmable logic device, and the like. The processors also include those that are used in computers, cellular phones, portable information terminals, personal digital assistants ("PDAs"), and other communication devices that facilitate communication of information between end users.

The embodiments of the present disclosure are described only in an exemplary manner with reference to the drawings. It would be apparent to a person of ordinary skill in the art to which the present disclosure pertains that various modifications could be made to the embodiments and that various equivalents thereof could be implemented.

What is claimed is:

1. An apparatus for controlling an in-vehicle infotainment system, the apparatus comprising:
   a vehicular-information input device configured to input a vehicular state;
   a communicator for mirroring with a mobile terminal;
   an input and output device configured to display output information based on information input thereinto;
   a memory having an executable program stored therein; and
   a processor operatively coupled to the vehicular-information input device, the communicator, the input and output device, and the memory,
   wherein the processor is configured to:
      control the communicator to establish a connection to the mobile terminal;
      compare the vehicular state, input from the vehicular-information input device, with a user-set state of a mirror function;

activate the mirroring function of mirroring with the mobile terminal; and output a screen of the mobile terminal through the input and output device.

2. The apparatus of claim 1, wherein the processor is further configured to store the user-set state by executing a mirroring activation mode in accordance with a timeline.

3. The apparatus of claim 1, wherein, in case the comparison with the user-set state results in a mirroring activation mode, the processor is further configured to activate the mirroring function through the comparison of the vehicular state.

4. The apparatus of claim 1, wherein the processor is further configured to:

disable the mirroring function in case the vehicular state indicates vehicular traveling; and activate the mirroring function in case the vehicular state indicates vehicular stoppage.

5. The apparatus of claim 1, wherein, in case content received during vehicular traveling is present, the processor is further configured to control the input and output device to display the content received after activating the mirroring function.

6. A method of controlling an in-vehicle infotainment system, the method comprising:

establishing, by a processor, a connection to a mobile terminal through a communication module;

determining, by the processor, a user-set state of a mirroring function;

determining, by the processor, a vehicular state, input from a vehicular-information input module, based on the user-set state; and outputting, by the processor, a screen of the mobile terminal through an input and output module by activating the mirroring function of mirroring with the mobile terminal as a result of determining the vehicular state.

7. The method of claim 6, further comprising:

setting, by the processor, the user-set state by being set to execute a mirroring activation mode in accordance with a timeline.

8. The method of claim 6, wherein, in the determining by the processor of the vehicular state, in case the determination of the user-set state results in the mirroring activation mode, the processor is further configured to determine the vehicular state.

9. The method of claim 6, wherein, in the outputting by the processor of the screen of the mobile terminal through the input and output device, the processor disables the mirroring function in case the determination of the vehicular state results in vehicular traveling, and activates the mirroring function in case the determination of the vehicular state results in vehicular stoppage.

10. The method of claim 6, wherein, in the outputting by the processor of the screen of the mobile terminal through the input and output device, in case content received in the mobile terminal during vehicular traveling is present, the processor displays the content received after activating the mirroring function.

11. A system for controlling in-vehicle infotainment, the system comprising:

a vehicular-information input device configured to provide a vehicular state;

a communicator for communicating with a mobile terminal;

an input and output device comprising a touch display;

a memory having an executable program stored therein; and a processor operatively coupled to the vehicular-information input device, the communicator, the input and output device, and the memory, wherein the processor is configured to:

control the communicator to establish a connection to the mobile terminal;

compare the vehicular state, provided by the vehicular-information input device, with a user-set state of a mirroring function;

activate the mirroring function of mirroring with the mobile terminal; and output a screen of the mobile terminal through the input and output device.

12. The system of claim 11, wherein the processor is further configured to store the user-set state by executing a mirroring activation mode in accordance with a timeline.

13. The system of claim 11, wherein the processor is further configured to:

determine a priority among the user-set state and the vehicular state;

activate the mirroring function in case the user-set state has priority over the vehicular state; and deactivate the mirroring function in case the vehicular state has higher priority over the user-set state.

14. The system of claim 11, wherein the processor is further configured to:

disable the mirroring function in case the vehicular state indicates that the vehicle is moving; and activate the mirroring function in case the vehicular state indicates the vehicle is immobile.

15. The system of claim 11, wherein, in case content is received while the vehicle is moving, the processor is further configured to control the input and output device to display the content received after activating the mirroring function.

16. The system of claim 11, wherein the processor is further configured to display a screen of the in-vehicle infotainment in conjunction with a screen of the mobile terminal on the display of the input and output device.

* * * * *